UNITED STATES PATENT OFFICE 2,002,970

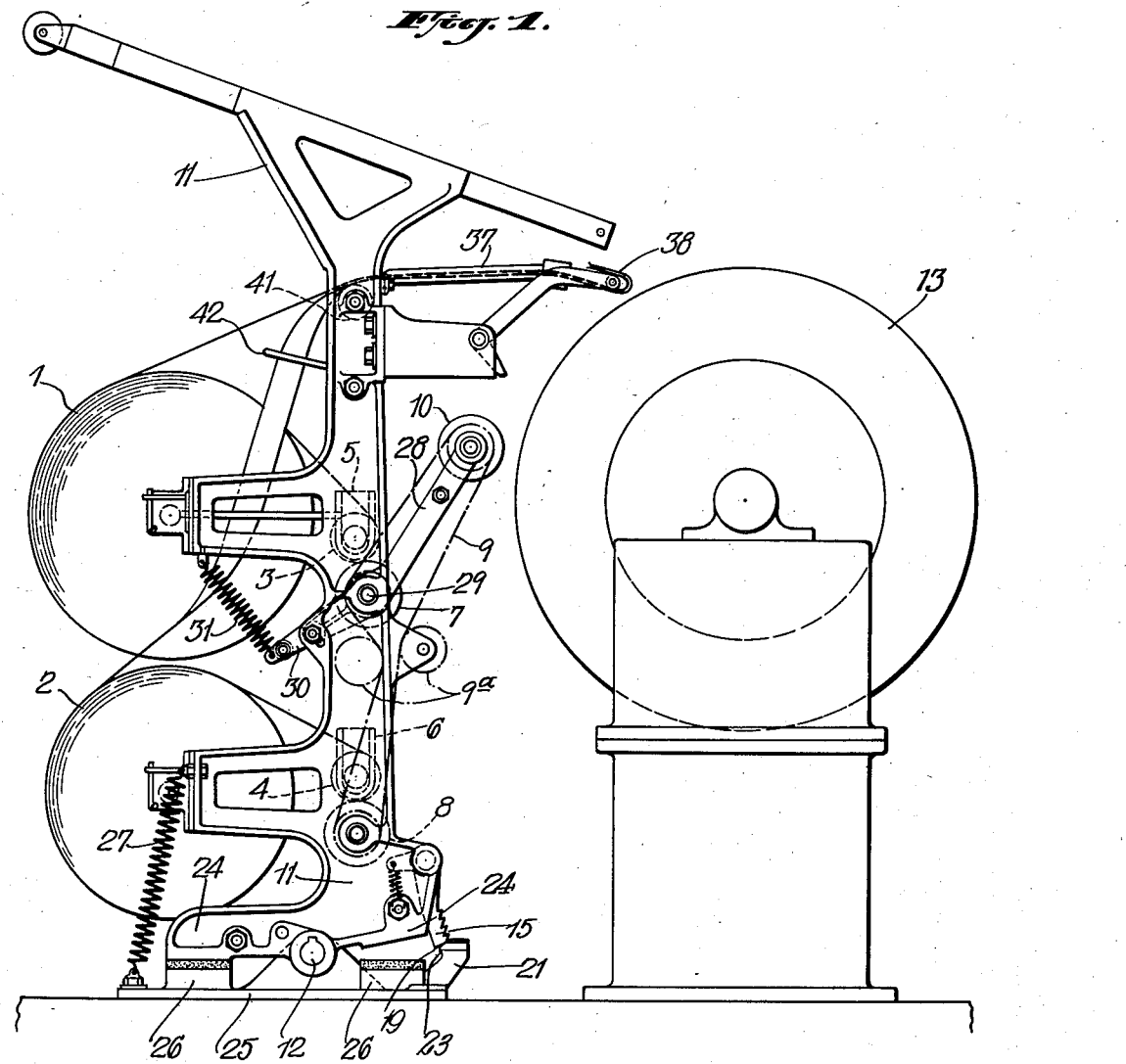

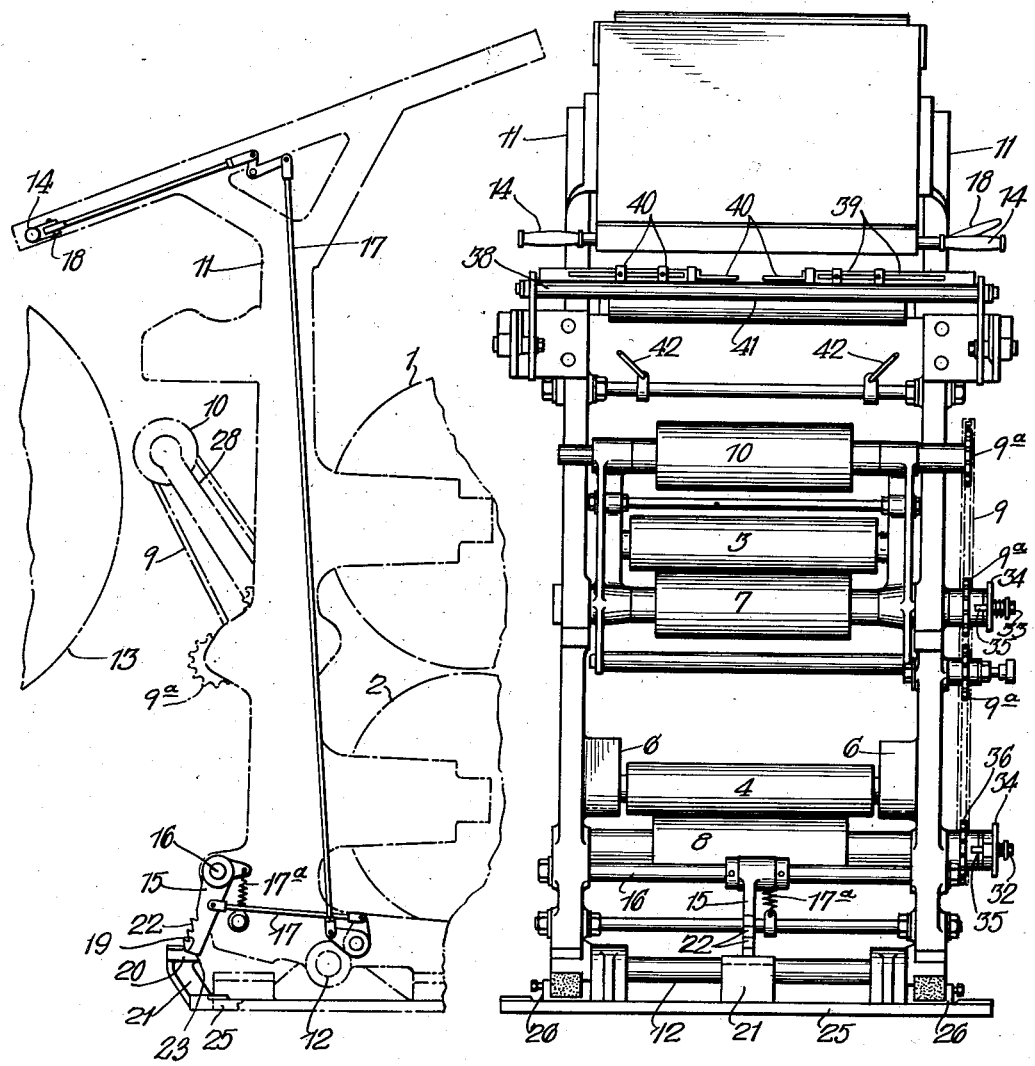

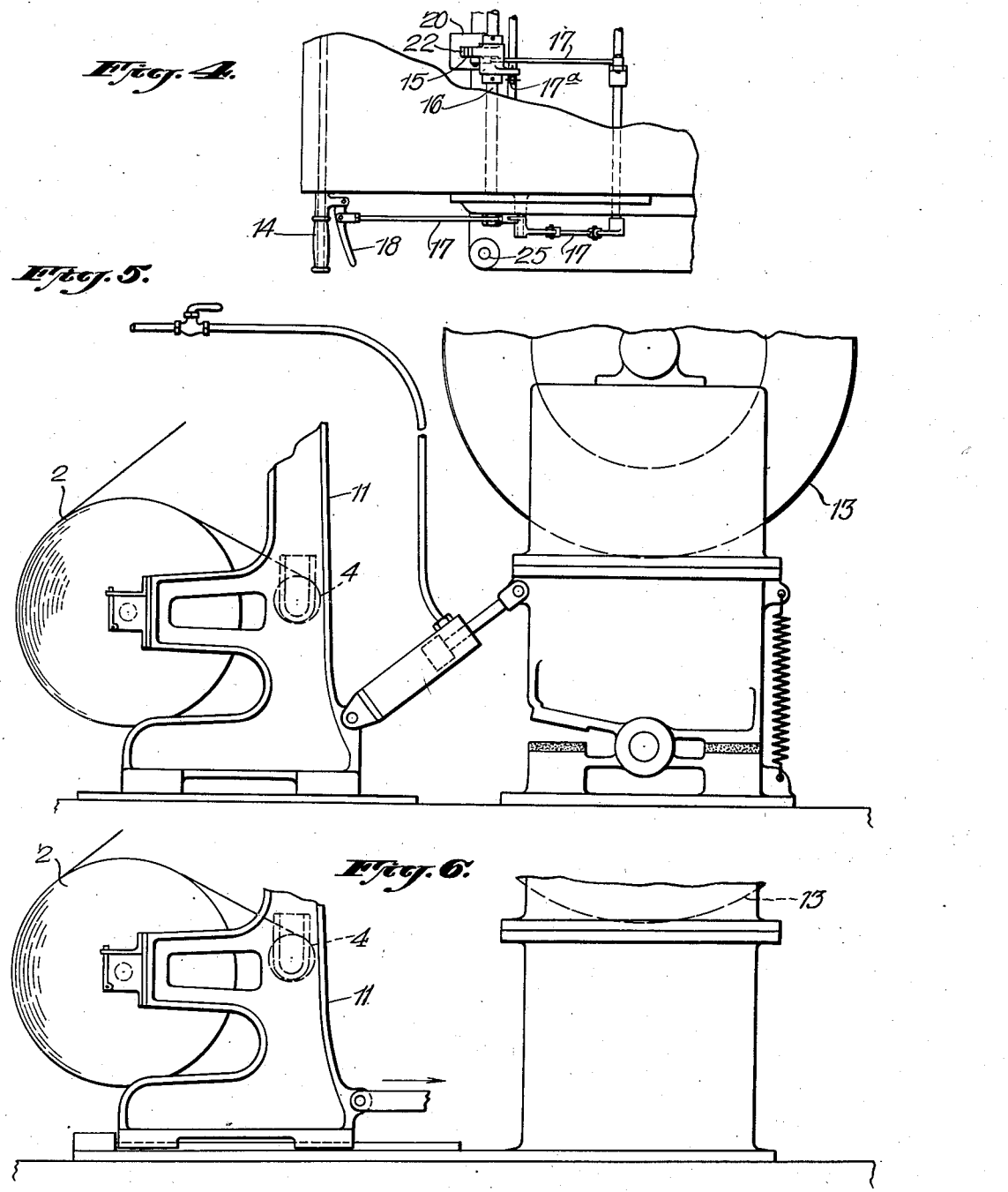

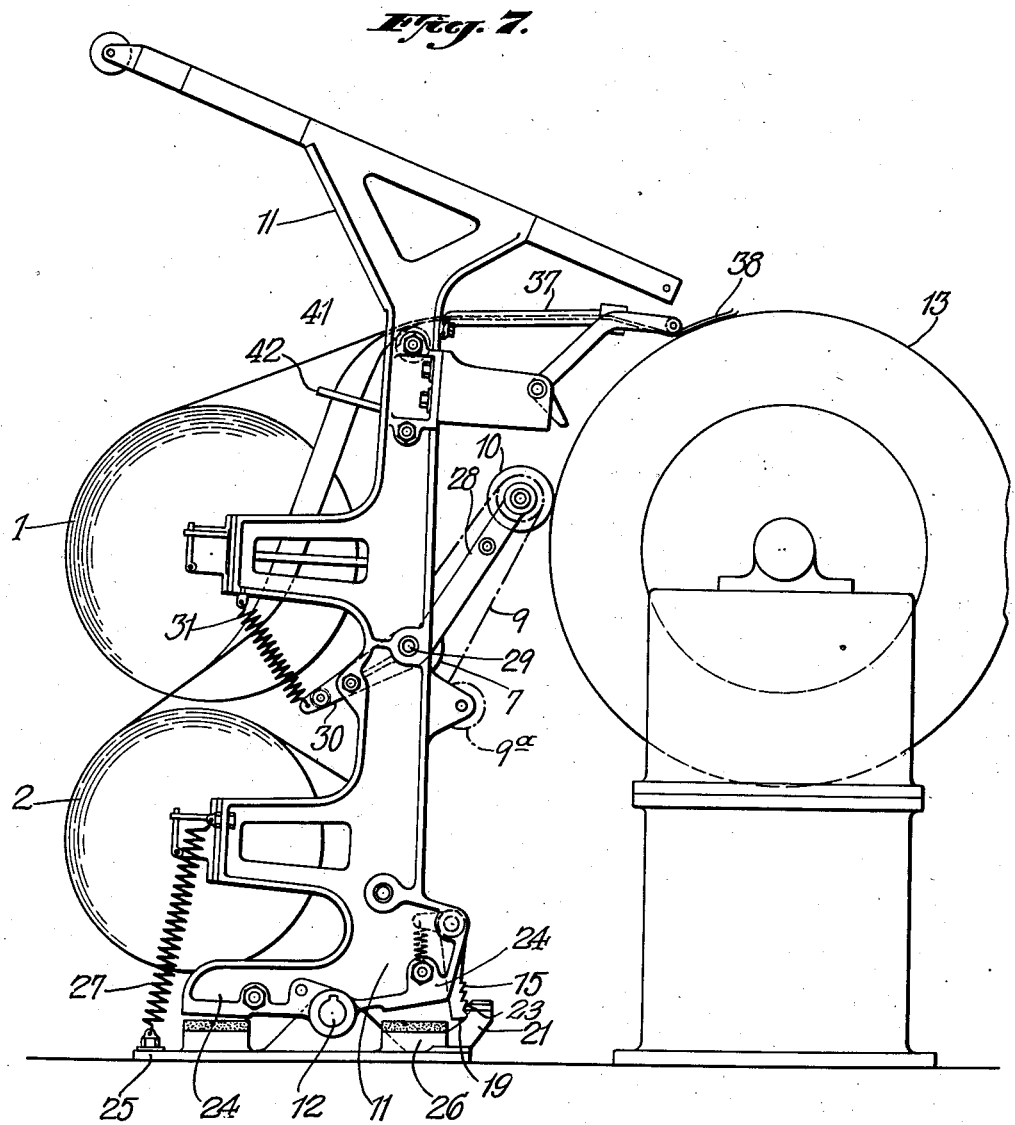

APPARATUS FOR THE MANUFACTURE OF PNEUMATIC TIRES

Harry Willshaw, Wylde Green, and Frank Arthur Davenport, Erdington, Birmingham, England, assignors to Dunlop Tire and Rubber Corporation, Buffalo, N. Y.

Application August 3, 1934, Serial No. 738,196
In Great Britain June 10, 1933

6 Claims. (Cl. 154—10)

This invention relates to the manufacture of pneumatic tires and its object is to provide new or improved means whereby the various components of the raw tire are assembled.

In the present invention a strip, or strips, of tire components are fed from a supply or stock roll to a drum or former on which they are assembled, and the supply or stock roll is driven from a driver which in turn is itself driven by frictional contact with the drum.

This driver may conveniently be in the form of a contact roller, and the rotation of the stock roll, therefore, has a definite relation to the speed of rotation of the drum.

The stock roll and driver mechanism are both supported by a supporting structure or frame and relative movement is provided between the frame and the drum whereby the driver or driving roll may be brought into and out of operative contact with the surface of the drum, the stock roll and driver remaining in fixed position relatively to each other during the rotation of the drum and driving roll.

Preferably the drum remains bodily stationary and the frame is adapted to pivot toward and away from it for the purpose specified. Said pivotal movement is preferably effected manually by detent mechanism serving to hold the mechanism in its adjusted position.

Preferably the driver is a roller provided essentially for the purpose of providing the drive for feeding the strip to the drum and transmits its drive via a further roller, hereinafter called the "secondary roller", also provided for said feeding purpose.

The strip in the stock roll may be rolled up in a "lining" to prevent the convolutions of said strip sticking together, and as said strip is unwound from the stock roll the lining is rolled up on a separate roll hereinafter called the "lining roll".

Preferably the stock roll is driven via the medium of said lining, for example, said lining roll may rest by gravity upon said secondary roller and be driven by frictional contact therewith.

Preferably a single driver provides the drive for at least two stock rolls, the above features being duplicated as will hereinafter appear.

The invention also includes means for guiding the strip onto the drum, and said guide, said driver and said pivot for the drum may be so arranged that said guide will always swing into contact or into reasonable proximity with the drum when said driver contacts said drum.

The various features of the invention are illustrated in the accompanying drawings in which—

Fig. 1 is an end view of the preferred form of apparatus according to this invention; Fig. 2 is a front view thereof; Fig. 3 is a skeleton end view taken from the opposite end showing the operating means for part of the mechanism; Fig. 4 is a detail plan view of part of Fig. 3; Figs. 5 and 6 are diagrammatic views of alternative forms of roll and frame mountings. Fig. 7 is a view showing diagrammatically the positions of the elements of the apparatus of Fig. 1 in driving position.

In the preferred embodiment there are two stock rolls 1 and 2 one above the other and a corresponding pair of lining rolls 3 and 4 are similarly disposed to the side of the stock rolls as seen in end elevation in Fig. 1.

Said lining rolls are adapted to slide vertically in bearings 5 and 6 and rest each on a roller 7 and 8—the secondary roller aforesaid—disposed immediately beneath said lining rolls.

These rollers 7 and 8 are both driven, by a common chain 9 passing round sprockets 9a, from a roller 10 which constitutes the driver aforesaid and which is adapted to be driven by frictional contact with the surface of the drum.

The stock roll is, as will be seen, driven via the medium of the lining whereby said stock roll is pulled round without strain upon the strip, the arrangement being such that the strip is fed from the stock roll, i. e. the stock roll is driven at the same surface speed as the drum and without undue tension.

All the rolls and rollers are mounted on a common frame 11 and the same is adapted to pivot about a point 12 at the foot thereof so as to bring the driver 10 into and out of contact with the drum 13.

This action may be effected in any convenient way—for example we may provide a fluid pressure system or other power means for doing it or alternatively we may rely on manual operation with or without mechanical aid such as a ratchet and pawl or other gearing system.

For example the frame may be adapted to be manipulated manually by handles 14, suitable detent mechanism being provided to control it. For example, as in Figs. 3 and 4, such mechanism may comprise a lever pivoted about the point 16 by means of the linkage system 17 shown in the drawings.

Said lever 15 is rocked to break the detent and so allow the frame to be swung, by means of a hand grip 18 associated with one of the handles 14, said lever being returned to make the detent, and so lock the frame, by means of the tension spring 17a—and the weight of the parts.

The underside 19 of the lever 15 co-acts with the face 20 of a bracket 21 to lock the frame upright in the non-operative position, i. e. the position in which the driver 10 is out of contact with the drum.

To lock the frame in the operative position, i. e. when the driver 10 is contacting the drum, the lever 15 is provided with ratchet teeth 22 which co-act with a fixed pawl or lip 23 on said bracket 21.

The frame 11 has wings 24 which co-act with a base plate 25, or with the floor, rubber buffers 26 being conveniently interposed. And said frame is spring loaded at 27 so that it tends normally to swing gently into the non-operative or upright position.

The driver 10 may, if desired, be spring loaded; for example, see Fig. 1, said roller may be carried on an arm 28 pivoted at 29 and extended at 30 to co-act with a tension spring 31.

Thus although the appended claims refer to a stock roll and driver stationary on the frame relatively to each other, actually we may provide for a certain slight relative movement or play. We do not intend the claims to exclude such movement as this but only to exclude such movements as carries the driver from a non-operative to an operative position in relation to the drum, and back.

Provision may be made to disassociate either lining roll from drive at all; such provision may comprise clutches 32 and 33 associated with the secondary rollers 8 and 7 respectively.

In operative position the clutch is in the position shown at 33 in Fig. 2; in the non-operative position it is as shown at 32. In the latter position a disc 34 has been pulled out by hand and given a half turn so that its extension 35 keeps it out, this disassociates the secondary roller 8 from the driven sprocket 36 so that said roller can be rotated by hand.

This provision facilitates loading and unloading—there is a certain amount of lining surplus, over the length of strip, at each end of the lining roll and this may be very readily reeled onto or off the spindle of the lining roll independently for each stock roll and independently of the power drive.

The frame aforesaid may carry a guide 37 for guiding the strip to the drum from the stock rolls aforesaid; the end of this guide may carry a roller 38 which assists correct laying of the strip in place. In Fig. 1 the path of the strip is shown in ordinary dotted line and that of the lining in chain dotted line.

So that the same arrangements will suit different sizes of drum, the end of said guide or its roller 38, the driver 10 and the pivot 12 are arranged in a particular relationship which will always swing the guide or its roller into contact or into reasonable proximity with the drum when the driver contacts said drum.

Instead, or in addition, the guide or part of it may be pivotal so as to collapse into contact or into close proximity with the drum.

The guide may be of any convenient form for example we may use a slotted plate 39 associated with provision, for example guides 40, adjustable for dealing with different strips: means for guiding the strip from the stock rolls to the guide roller 38 may also be provided, for example an idler roller 41 and/or guide bars 42.

It should be understood that we do not confine ourselves to any one particular embodiment of our invention as the same may be embodied in a number of different forms without departing from the spirit of our said invention.

For example instead of pivoting the frame toward the drum we may pivot the drum toward the frame, as shown in Fig. 5. And we do not confine ourselves to a pivotal movement as described, as for example we may use a simple sliding movement, as in Fig. 6.

What we claim is:

1. Apparatus for building pneumatic tires comprising a forming drum, a frame movable toward and from said drum, a stock roll and feeding mechanism mounted on said frame, and a driving mechanism mounted on said frame to rotate said feeding mechanism and stock roll and comprising means to contact with the surface of said drum when said frame is moved toward said drum and to be free of said drum when said frame is moved away from said drum.

2. Apparatus for building pneumatic tire casings which comprises a forming drum, a frame movable toward and from the surface of said drum, a stock roll on said frame, a guide on said frame, and a driving mechanism on said frame, said driving mechanism comprising a member to contact with and be driven from said forming drum when moved thereto, said stock roll and guide being in substantially fixed positions on said frame.

3. Apparatus for building pneumatic tire casings which comprises a forming drum, a frame tiltable towards and from said drum, said frame having a stock roll a guide and a driving mechanism therefor, said driving mechanism comprising a roller to contact with the peripheral surface of said drum when said frame is tilted towards said drum, said roll and said guide being in substantially fixed relative positions, and said guide being brought toward the peripheral surface of said drum when said driving roller contacts therewith.

4. Apparatus for building pneumatic tire casings which comprises a forming drum, a frame tiltable toward and from said drum, said frame carrying a driving mechanism having a roller to contact with the peripheral surface of said drum and carrying in relatively fixed positions a stock roll driven by said driving mechanism and a guide, said roller and guide being brought into contact with said drum when said frame is tilted toward said drum.

5. The apparatus of claim 4 in which said driving roll is yieldingly mounted on said frame.

6. The apparatus of claim 1 in which said frame and said drum are in relatively slidable relation.

HARRY WILLSHAW.
FRANK ARTHUR DAVENPORT.